(12) United States Patent
Cornelissen et al.

(10) Patent No.: US 6,774,960 B2
(45) Date of Patent: Aug. 10, 2004

(54) DISPLAY DEVICE WITH LIGHT GUIDE HAVING POLARIZING MATERIAL WITH REGIONS CONVERTED INTO ISOTROPIC MATERIAL

(75) Inventors: Hugo Johan Cornelissen, Eindhoven (NL); Dirk Jan Broer, Eindhoven (NL); Peter Van De Witte, Heerlen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/341,568

(22) Filed: Jan. 13, 2003

(65) Prior Publication Data

US 2003/0137617 A1 Jul. 24, 2003

Related U.S. Application Data

(63) Continuation of application No. 09/749,176, filed on Dec. 27, 2000, now Pat. No. 6,545,734.

(30) Foreign Application Priority Data

Jan. 14, 2000 (EP) .............................................. 00200134

(51) Int. Cl.$^7$ ............................................. G02F 1/1335

(52) U.S. Cl. ............................................. 349/65; 362/26
(58) Field of Search ................................ 349/63, 64, 65

(56) References Cited

U.S. PATENT DOCUMENTS

| | | | |
|---|---|---|---|
| 5,856,855 A | * | 1/1999 | Mol et al. ..................... 349/65 |
| 6,204,899 B1 | * | 3/2001 | Hall ............................ 349/65 |
| 6,340,999 B1 | * | 1/2002 | Masuda et al. ............... 349/63 |
| 6,377,325 B2 | * | 4/2002 | Faris et al. ................... 349/98 |
| 6,421,104 B1 | * | 7/2002 | Richard ....................... 349/63 |

FOREIGN PATENT DOCUMENTS

| | | | |
|---|---|---|---|
| EP | 0750209 A1 | 12/1996 | ......... G02F/1/1335 |
| EP | 0770818 A2 | 5/1997 | ............. F21V/8/00 |
| WO | WO9922268 | 5/1999 | |

* cited by examiner

Primary Examiner—Tarifur R. Chowdhury
Assistant Examiner—Timothy L Rude
(74) Attorney, Agent, or Firm—Dicran Halajian

(57) ABSTRACT

Transflective display device has an optical waveguide commonly known as a light guide. The guide includes areas having a chiral nematic structure which splits light coming in from aside into two light beams having a mutually opposite circular polarization. Polarization splitting is achieved at the interface of the areas having the chiral nematic structure.

13 Claims, 4 Drawing Sheets

DISPLAY DEVICE WITH LIGHT GUIDE HAVING POLARIZING MATERIAL WITH REGIONS CONVERTED INTO ISOTROPIC MATERIAL

CROSS REFERENCE TO RELATED APPLICATIONS

This is a continuation of prior application Ser. No. 09/749,176 filed Dec. 27, 2000, now U.S. Pat. No. 6,545,734.

FIELD OF THE INVENTION

The invention relates to a display device comprising an image display panel having a first substrate which is provided with light-reflecting electrodes at the area of pixels, an illumination system comprising an optical waveguide of an optically transparent material having an exit face facing the image display panel and a plurality of end faces, at least one of said end faces being an entrance face for light, while light can be coupled into said end face of the optical waveguide.

The image display panel may comprise an electro-optical medium (between two substrates) such as liquid crystalline material or an electrochromic material. It may also be based on electrostatic forces (deformable mirrors).

The invention also relates to an illumination unit (or front light) for such a display device and to methods of manufacturing such illumination units.

Such reflective display devices are used in, for example, portable apparatus such as laptop computers, mobile telephones, personal organizers, etc. With a view to saving energy, it is desirable that the light source can be switched off in the case of sufficient ambient light.

BACKGROUND OF THE INVENTION

A display device of the type mentioned above is described in WO 99/22268. In the optical waveguide described in this document, an unpolarized beam from the light source as split up into two mutually perpendicularly polarized beam components. Polarization separation is obtained by causing the unpolarized beam to be incident on an interface between an area of isotropic material having a refractive index np and an area of anisotropic material having refractive indices no and ne, in which one of the two indices no or ne is equal or substantially equal to np. When an unpolarized beam is incident on such an interface, the beam component which does not experience any refractive index difference at the transition between isotropic and anisotropic material is passed in an undeflected form, whereas the other beam component is deflected or reflected. One of the two beam components is subsequently passed by a polarizer to a reflective liquid crystal panel. The optical waveguide shown exhibits much less image distortion than a known optical waveguide with a groove structure (microprisms) on the viewing side of the optical waveguide. The image distortion is produced because the groove structure has different slopes, which results in multiple image formation. Generally, this multiple image formation is prevented by providing an optical compensator having a complementary groove structure.

However, in the display device described in WO 99/22268, stray light is generated in the viewing direction on the interface between the areas with isotropic and anisotropic material.

Moreover, the light which is deflected in the direction of the image display panel sometimes undergoes partial reflections in the image display panel and in the optical waveguide before the light reaches the reflecting pixels.

These drawbacks apply to the same or an even greater extent to optical waveguides which are based on a groove structure.

SUMMARY OF THE INVENTION

It is, inter alia, an object of the present invention to provide a solution to the above-mentioned problem.

To this end, a display device according to the invention is characterized in that the optical waveguide is present between the image display panel and a circular polarizer, and the optical waveguide comprises polarizing means for substantially circularly polarizing the entering light. In this application, the word circular is also understood to be "elliptical". In certain circumstances (when less contrast is sufficient) it is also possible to work with elliptically polarized light.

The polarizer may be integrated in the display device.

The polarizing means have a similar function as in the known device, namely polarizing light rays from the light source, in which light of one kind of polarization (for example, levorotatory polarization) is deflected in the direction of the image display panel. In the relevant case, light exiting on the viewing side (dextrorotatory polarized light in the same example) is not passed by the polarizer.

Due to polarization, an unpolarized beam from the light source is split up into two mutually oppositely polarized beam components (levorotatory and dextrorotatory). Such a polarization separation is obtained, for example, by causing the unpolarized beam to be incident on an interface between an area of isotropic material and an area of chiral nematic material, for example, a chiral nematic liquid crystal material provided in, for example, a groove structure, or a (patterned) chiral nematic network. When an unpolarized beam is incident on such an interface, a beam component of one handedness is passed undeflected on the transition between isotropic and chiral nematic material, while the beam component having the other, opposite handedness is deflected or reflected.

A suitable embodiment is characterized in that the pitch of the chiral nematic liquid crystal material or the chiral nematic polymer network within a groove varies. A larger bandwidth of the reflected light can thereby be obtained.

A first method of manufacturing such an illumination unit (or front light) provided with polarizing means for circularly (or elliptically) polarizing the entering light is characterized in that a surface of a transparent body is provided with grooves, and the transparent body within the grooves is provided with a chiral nematic liquid crystal material or the chiral nematic polymer network.

A second method is characterized in that a surface of a transparent body is provided with a layer of a chiral nematic material which is locally converted into isotropic material.

These and other aspects of the invention are apparent from and will be elucidated with reference to the embodiments described hereinafter.

BRIEF DESCRIPTION OF THE DRAWINGS

In the drawings:

FIG. 2 is a cross-section of an optical waveguide, while

The Figures are diagrammatic and not to scale. Corresponding components generally have the same reference numerals.

DETAILED DESCRIPTION OF THE INVENTION

Figure 1:
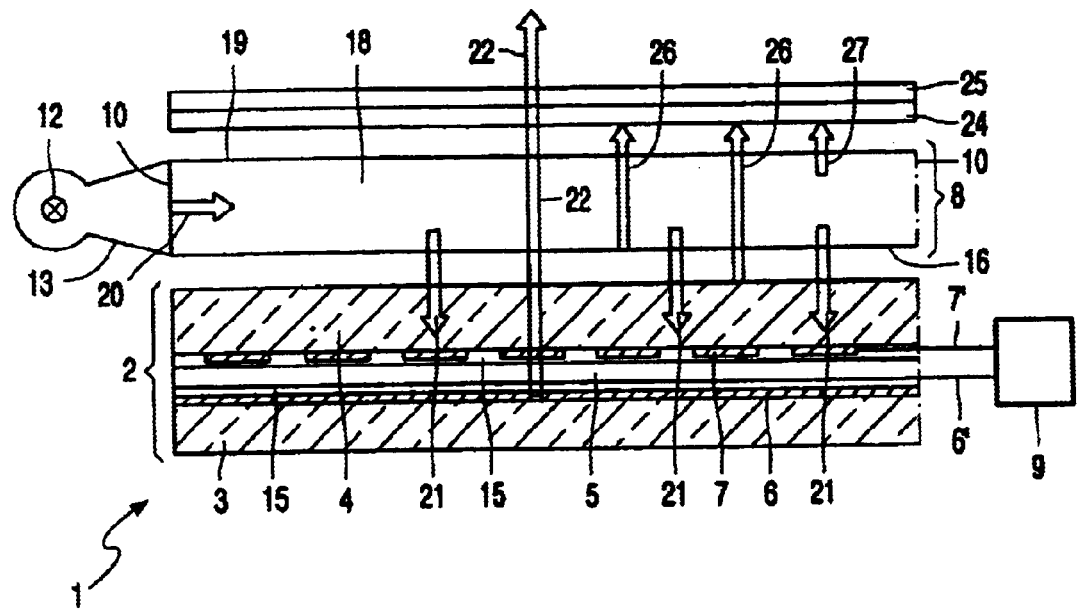
FIG. 1 is a cross-section of an embodiment of a reflective display device according to the invention.

The display device 1 shown diagrammatically in FIG. 1 comprises an image display panel 2 and an illumination system (or front light) 8.

The image display panel 2 comprises a liquid crystalline material 5 between two substrates 3, 4, based on the twisted nematic (TN), the supertwisted nematic (STN) or the ferroelectric effect so as to modulate the direction of polarization of incident light. The image display panel comprises, for example, a matrix of pixels for which light-reflecting picture electrodes 6 are provided on the substrate 3. The substrate 4 is light-transmissive and has one or more light-transmissive electrodes 7 of, for example, ITO (indium tin oxide). The picture electrodes are provided with electric voltages via connection wires 6', 7' which are provided with drive voltages by means of a drive unit 9. The substrates and electrodes are coated with orientation layers 15 in known manner.

The illumination system 8 comprises an optical waveguide 18 which is made of an optically transparent material and has four end faces 10. A light source 12 whose light is coupled into the optical waveguide 18 via one of the end faces, for example 10, is situated opposite this end face. The light source 12 may be, for example, a rod-shaped fluorescence lamp. The light source may alternatively be constituted by one or more light-emitting diodes (LED), notably in flat panel display devices having small image display panels such as, for example, portable telephones. Moreover, the light source 12 may be detachable.

The exit face 16 of the optical waveguide 8 faces the image display panel 2. Each end face 10 of the transparent plate in which light is not coupled in may be provided with a reflector. In this way, light which is not coupled out on the exit face 16 and consequently propagates through the optical waveguide and arrives at an end face is thus prevented from leaving the optical waveguide 18 via this end face 10.

To prevent light from leaving the optical waveguide 18 without contributing to the light output of the illumination system, light of the lamp 12 is preferably coupled into the optical waveguide 18 via coupling means 13, for example, by means of a wedge-shaped optical waveguide which limits the angle of the entering beam with respect to the exit faces 16, 19 to, for example, 15 degrees. Moreover, the contrast is enhanced because there is no stray light.

A light beam 20 from the lamp 12 is converted in a manner to be described below into circularly polarized light so that mainly light of one handedness is deflected towards the reflective image display panel 2 (beams 21) and, dependent on the state of a pixel, reflected (beam 22) with the same or the opposite handedness. After reflection on the pixel, the circularly polarized light of the opposite handedness is converted in a phase plate or retarder 24 into linearly polarized light and reaches a polarizer 25 with such a direction of the transmission axis in this embodiment that the reflected light is absorbed. Similarly, circularly polarized light of the same handedness is passed by the polarizer 25.

Stray light, which is reflected on internal surfaces (for example, the surface 16), has a handedness which is opposed to that of the beam 22 and is also converted by the retarder 24 into linearly polarized light which is absorbed by the polarizer 25 (beams 26). Also parasitic light generated in the optical waveguide 18 due to internal reflection is absorbed by the polarizer 25 (beam 27).

Figure 2:
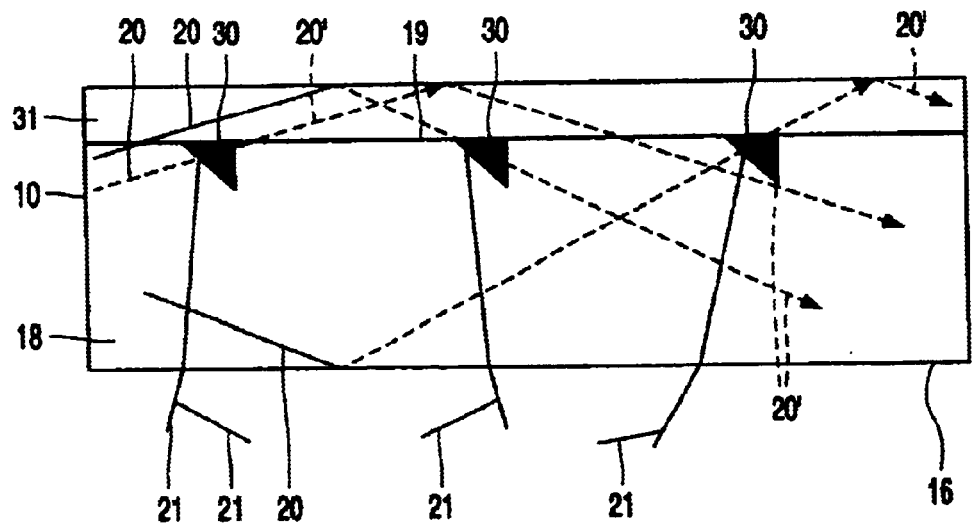

FIG. 2 is a cross-section of a first embodiment of an optical waveguide with which the above-mentioned effect can be achieved. On an exit face 19, the optical waveguide 18 has a plurality of grooves 30 which are filled with a chiral nematic liquid crystalline mixture and are covered with a 20–50 μm thick plate 31 of, for example, acryl or glass. On the side facing the light source, the grooves 30 preferably extend at an angle of 45 degrees to the surface 19 so that light 21 coupled out by the grooves leaves the optical waveguide substantially perpendicularly to the surface 16 in the direction of the display device 2. Consequently, a very efficient illumination of the reflective display device 2 is achieved. Since the grooves are filled with chiral nematic liquid crystalline material, levorotatory or dextrorotatory circularly polarized light is reflected (beams 21), dependent on the material used and on the surface treatment. In this embodiment, levorotatory light is reflected in a spectral range determined by the pitch p of the chiral nematic liquid crystalline material and the refractive indices $n_e$, $n_o$ ($n_e$: extraordinary refractive index and $n_o$: ordinary refractive index); light having a wavelength in the range between $\lambda_e = n_e \cdot p$ and $\lambda_o = n_o \cdot p$ is reflected. Dextrorotatory polarized light 20' remains within the optical waveguide 18 due to reflection on the surfaces 16, 19 and due to a favorably chosen angle of incidence of the beam 20, and, after internal reflections can again be reflected on a groove 30.

Figure 3:
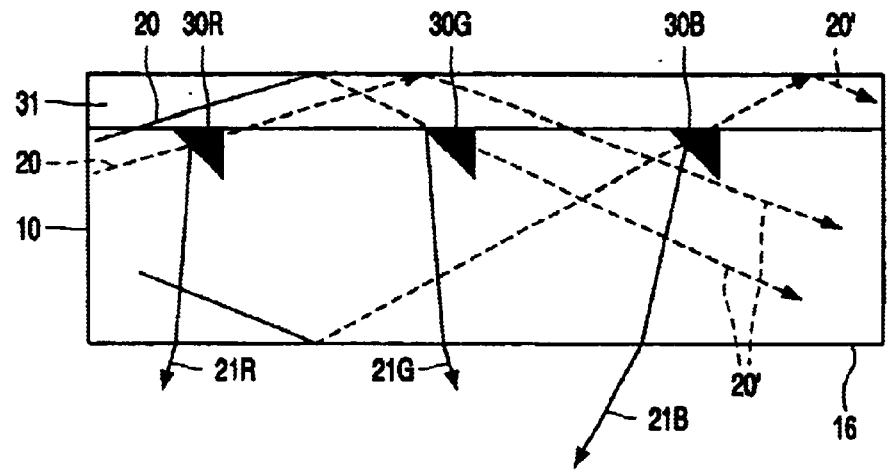
FIGS. 3 and 4 are variants of FIG. 2.

In the embodiment of FIG. 3, the grooves 30 are provided with chiral nematic polymer networks. The pitch of the chiral nematic material in each groove 30R, 30G, 30B is adapted in such a way that red (beam 21R), blue (beam 21B) and green (beam 21G) light is reflected and leaves the optical waveguide substantially perpendicularly to the surface 16 in the direction of the display device 2. The reference numerals again denote the same components as those in FIG. 2. In this way, different grooves couple different parts of the spectrum, with a very good adaptation being possible to the wavelength of the light source(s) 12, notably when LEDs having a narrow emission spectrum are used for this purpose. When the choice of the liquid crystal material and the pitch limits the reflection band to a very narrow band (at most equal to that of the spectrum emitted by the LED) the light to be reflected and the reflected light are minimally disturbed during use in reflection (when the light source 12 is switched off).

Figure 4:
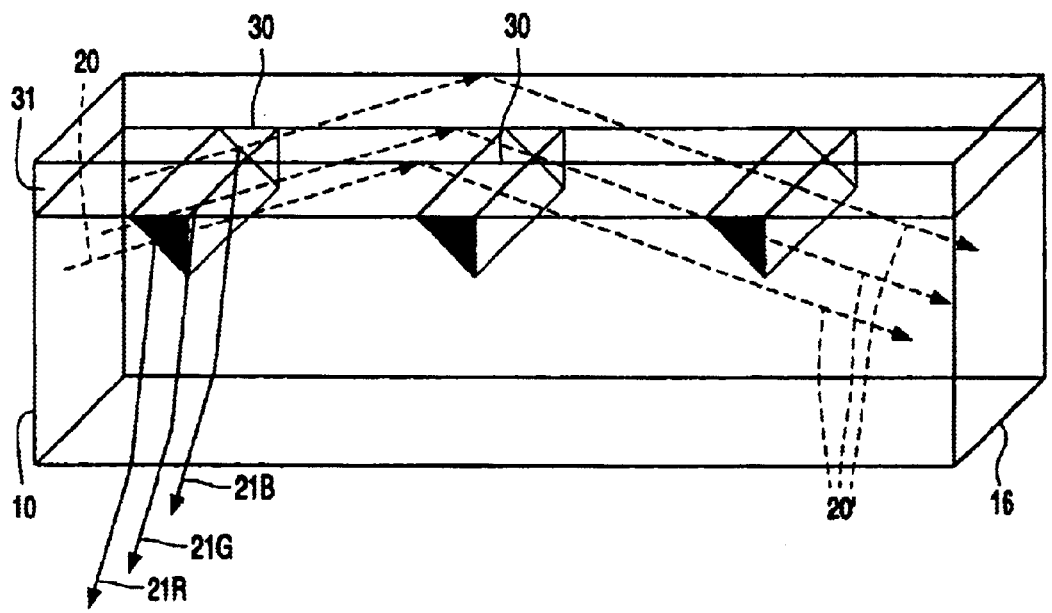

The pitch of the chiral nematic material within a groove 30 may also vary to such an extent that a wide spectrum is reflected so that each groove 30 reflects beams 21R, 21G and 21B (FIG. 4).

The mutual parts (display device, optical waveguide and retarder-polarizer combination) are preferably mutually secured by means of a transparent adhesive having a low refractive index. The choice of a low refractive index also prevents the above-mentioned parasitic reflections.

Figure 5:
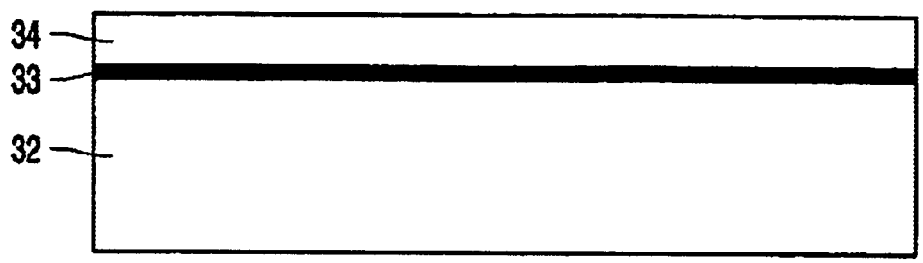
FIGS. 5 to 10 are cross-sections of an optical waveguide during one stage of a plurality of possible manufacturing methods.
Figure 6:
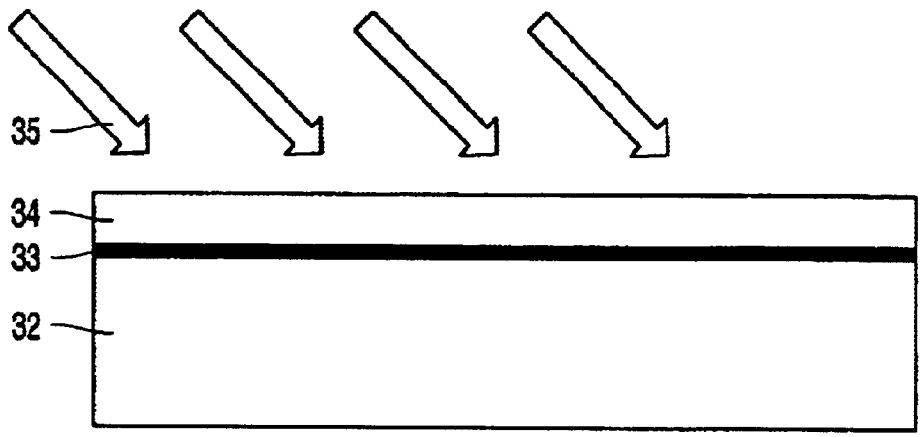
Figure 7:
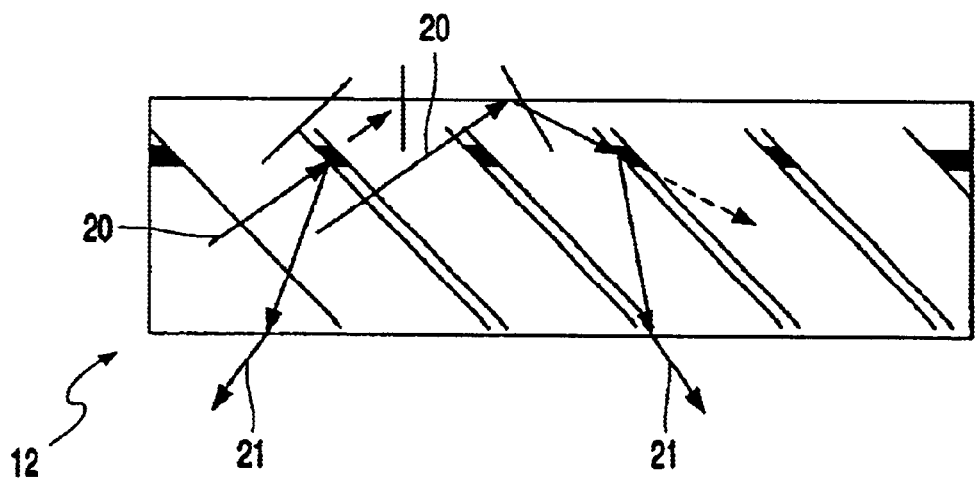

FIGS. 5 to 7 show the method of manufacturing an optical waveguide which does not have microgrooves but generates circularly polarized light which is deflected towards the reflective image display panel 2. A thin layer 33 of a chiral nematic liquid crystal polymer material is provided on a basic substrate 32 of, for example, glass and is coated, if necessary, with an isotropic transparent protective coating 34. The coating 34 is subsequently made locally isotropic, in this case by means of laser beams 35 which are incident at an angle of 45 degrees. The chiral nematic liquid crystal polymer material remains anisotropic in the areas which are not irradiated. By suitable choice of the ratio between isotropic and anisotropic areas, an optical waveguide 18 is obtained with areas 30 which convert an incident light beam into light beams 21 leaving the optical waveguide in the direction of the display device 2.

Figure 8:
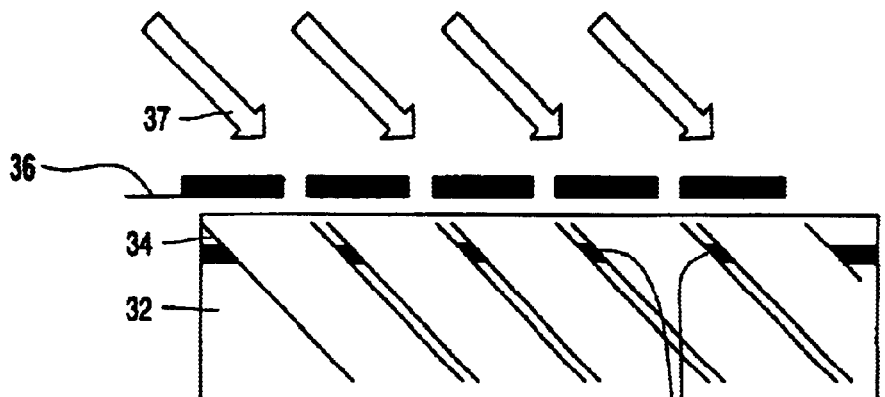
Figure 9:
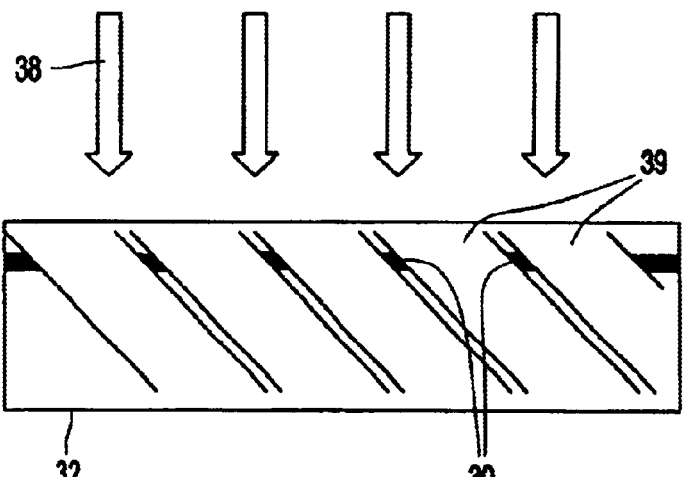

In the method shown in FIGS. 8–9, the substrate is coated with a mixture of chiral nematic monomers, which mixture is subsequently exposed via the mask 36 (by means of, for example UV radiation 37 again incident at an angle of 45 degrees) up to a temperature below the isotropic transition temperature. The chiral nematic ordering is thereby locally frozen (areas 30) Subsequently, the assembly is heated to a temperature above the isotropic transition temperature (by means of, for example thermal radiation) so that the unexposed parts 39 become isotropic and are fixed to a polymer network by means of local illumination 38 (flood exposure).

Figure 10:
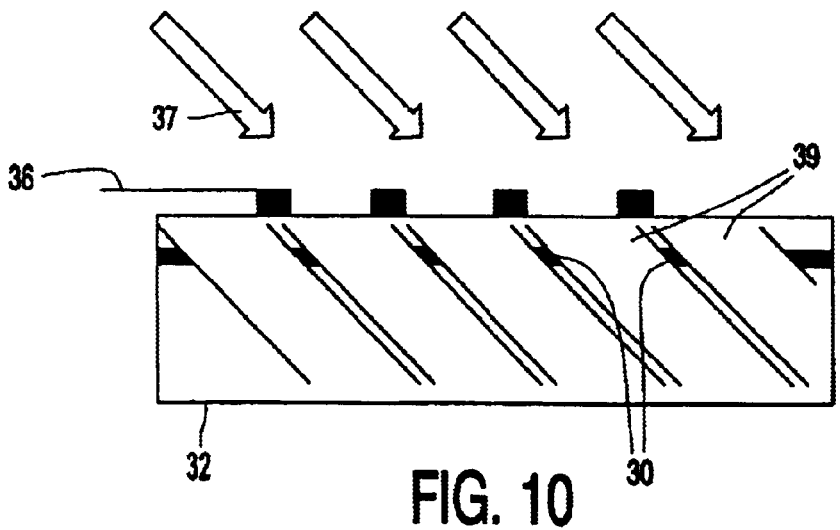

Finally, the method shown in FIG. 10 makes use of "photo-isomerizable"chiral nematic polymers, a layer of which is provided again between a basic substrate and a coating. The material is chosen to be such (pitch, refractive indices) that it reflects the desired wavelength. By local UV illumination via the mask 36, the value of the reflected wavelength shifts to higher values, for example, to infrared. The unexposed parts 30 continue reflecting the desired wavelength, while the other reflection is not visible to the human eye.

The protective scope of the invention is not limited to the embodiments described. It has already been noted that elliptically polarized light may be used alternatively, although this is at the expense of the suppression of stray light. Also, other electro-optical effects may be used, for example, electrochromic effects. As mentioned in the opening paragraph a display comprising deformable mirrors may be used as well. Circularly polarized light may also be obtained in the optical waveguide by providing a (pattern of) ¼λ plate(s), combined with (a) linear reflector and/or mirror (s). The invention resides in each and every novel characteristic feature and each and every combination of characteristic features. Reference numerals in the claims do not limit their protective scope. Use of the verb "comprise" and its conjugations does not exclude the presence of elements other than those mentioned in the claims. Use of the article "a" or "an" preceding an element does not exclude the presence of a plurality of such elements.

What is claimed is:

1. A front-lighted reflective display device comprising an image display panel having a first substrate which is provided with light-reflecting electrodes at the area of pixels, an illumination system comprising an optical waveguide of an optically transparent material having an exit face facing the image display panel and a plurality of end faces, at least one of said end faces being an entrance face for light, while light can be coupled into said end face of the optical waveguide, wherein the optical waveguide is present between the image display panel and a circular polarizer, and the optical waveguide comprises polarizing means for substantially circularly polarizing light entering the polarizing means, said polarizing means including anisotropic material and locally converted regions of isotropic material.

2. A front-lighted reflective display device as claimed in claim 1, wherein the image display panel comprises a second light-transmissive substrate and electro-optical material between the two substrates.

3. A front-lighted reflective display device as claimed in claim 1, wherein the polarizing means comprise a chiral nematic liquid crystal material.

4. A front-lighted reflective display device as claimed in claim 3, wherein the polarizing means comprise a patterned chiral nematic polymer network in the optical waveguide.

5. A front-lighted reflective display device as claimed in claim 1, wherein the polarizing means comprise a chiral nematic polymer network.

6. A front-lighted reflective display device as claimed in claim 5, wherein the polarizing means comprise a patterned chiral nematic polymer network in the optical waveguide.

7. A front light comprising an optical waveguide of optically transparent material and a plurality of end faces, at least one of said end faces being an entrance face for light, while light can be coupled into said end face of the optical waveguide, wherein the optical waveguide comprises polarizing means for circularly polarizing light entering the polarizing means, said polarizing means including anisotropic material and locally converted regions of isotropic material.

8. A front light as claimed in claim 7, wherein the polarizing means comprise a chiral nematic crystal material.

9. A front light as claimed in claim 8, wherein the polarizing means comprise a patterned chiral nematic polymer network in the optical waveguide.

10. A front light as claimed in claim 7, wherein the polarizing means comprise a chiral nematic polymer network.

11. A front light as claimed in claim 10, wherein the polarizing means comprise a patterned chiral nematic polymer network in the optical waveguide.

12. A method of manufacturing a front light comprising polarizing means for circularly polarizing the entering light, wherein a surface of a transparent body is provided with a layer of a chiral nematic material which is locally converted into isotropic material.

13. A method of manufacturing a front light comprising polarizing means for circularly polarizing the entering light, wherein a surface of a transparent body is provided with a layer of a chiral nematic material which is locally converted into chiral nematic material having a reflection band outside the visible range.

* * * * *